Sept. 6, 1932.  W. J. EDMONDS  1,875,714
SYNTHETIC METHANOL PROCESS
Filed Dec. 13, 1926
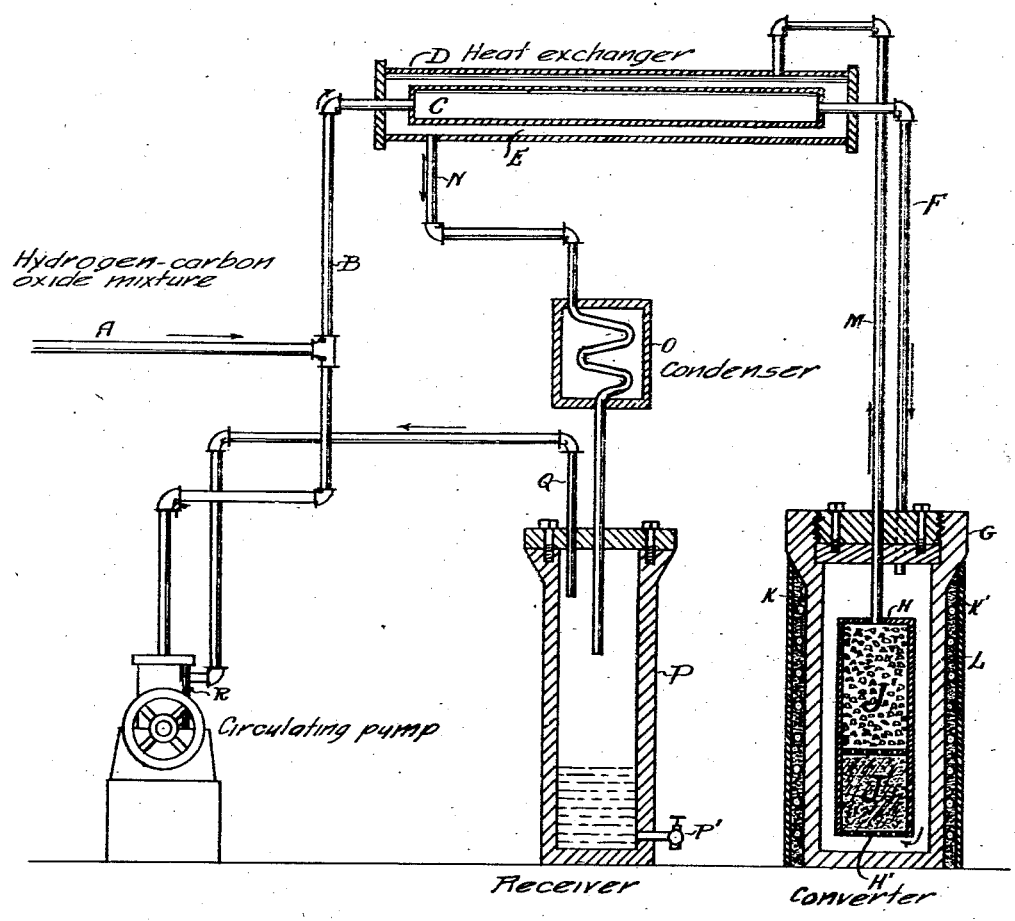
William J. Edmonds
Inventor
By Bruce K. Brown
atty Patented Sept. 6, 1932

1,875,714

UNITED STATES PATENT OFFICE

WILLIAM J. EDMONDS, OF TERRE HAUTE, INDIANA, ASSIGNOR TO COMMERCIAL SOLVENTS CORPORATION, OF TERRE HAUTE, INDIANA, A CORPORATION OF MARYLAND

SYNTHETIC METHANOL PROCESS

Application filed December 13, 1926. Serial No. 154,634.

My invention relates to an improvement in the process of producing synthetic methanol by the reaction of hydrogen and carbon dioxide at elevated temperatures and pressures under the influence of suitable catalysts. More particularly my invention relates to a process in which the interacting gases are properly proportioned to obtain a maximum yield of methanol and a minimum yield of undesirable by-products.

As is well known, methanol may be produced by the interaction of hydrogen with carbon monoxide, or carbon dioxide, or mixtures of the two.

I have now discovered that, in the case of the interaction of carbon dioxide and hydrogen catalytically at elevated temperatures and pressures to produce methanol, optimum results are obtained only when the carbon dioxide is present in extremely small proportion, that is, in a proportion to the hydrogen present which is far less than the correct theoretical proportion.

The combined reaction by which it has been assumed that methanol is produced from carbon dioxide is one of the fourth order and is expressed as follows:

$$3H_2 + CO_2 \rightleftarrows CH_3OH + H_2O$$

Some persons have further assumed that this combined reaction might be separated into two simple equations, thus:—

$$CO_2 + H_2 \rightleftarrows CO + H_2O;$$
$$CO + 2H_2 \rightleftarrows CH_3OH.$$

If the true reaction is assumed to be the simple reaction above shown, it follows from theoretical reasoning that the rate of reaction should be at a maximum when theoretical proportions of carbon dioxide and hydrogen are present in the gaseous mixture.

In connection with my experiments on the production of methanol from mixtures of hydrogen and carbon dioxide, I have passed gases containing various proportions of these ingredients over suitable catalytic agents at temperatures of 300–500° C., and at pressures in excess of 50 atmospheres. All of the gases present are not reacted during one passage over the catalyst and hence it is the practice to recirculate the residual gases over the catalyst in cyclic fashion, nothing being removed from the process except the water and methanol which are formed. To maintain the volume of gas, which is continually diminished by the reaction, fresh gas is constantly added to the system.

The method of manufacture of methanol from mixtures of carbon dioxide and hydrogen may be more clearly described with reference to Fig. 1 of the drawing which shows a suitable apparatus in cross-section. The gas mixture to be reacted is supplied to the process at the desired pressure through the "make-up" gas pipe A by the compressor (not shown). This gas mixes with the gas of the circulating system at connection B, and the mixed gases pass upward into the internal passage C of heat exchanger D. While passing through the heat exchanger the gas is heated by thermal contact with the hot gas from the methanol reaction which passes in reverse direction through the annular space E between the inner and outer walls of the heat exchanger. From the exchanger the warmed gas passes downward through pipe F into the converter (catalyst bomb) G. The gas passes downward in the annular space between the inside wall of the converter and the wall of the catalyst basket H then rises upward through the catalyst J and J' through the perforated plate H' forming the bottom of the basket H.

The drawing shows the catalyst as separated into two sections, J and J'. Section J is designed to act as a "pre-catalyst" or purifier, to destroy or absorb any catalyst poisons which may be present in the gas, and thus to preserve the catalytic activity of section J' for the methanol reaction. The elevated temperature in the converter G is largely maintained by the heat of reaction, but supplementary heat is provided for by means of electric heating elements K, K', embedded in an insulating jacket L which surrounds G.

As the hot gas passes through the catalyst the methanol reaction occurs, though all of the carbon oxides present in the gas are not reacted at one passage. The hot gas discharged from the converter through pipe M contains methanol vapors, (water if carbon dioxide is present) and any reaction by-products formed, as well as unreacted carbon oxides and hydrogen. This gas passes through the annular space E of heat exchanger D giving up most of its heat to the incoming gas.

The partially cooled gas then passes from the heat exchanger D via pipe N to the condenser O where it is cooled. The methanol thus obtained in liquid form together with any water present is deposited in the receiver P, from which the liquid may be removed through drain P'. The residual, unreacted, gas rises through pipe Q and passes to circulating pump R.

The circulating pump R withdraws the residual gas from the receiver P and combines it with the make-up gas at connection B. In operating the process, the circulating pump R serves to circulate the gas through the system and to overcome pressure drops due to friction in the pipes and catalyst chamber. There is of course a constant diminution in the pressure of the system due to the reaction of the gases to form methanol. To sustain the pressure in the circulating system and to replace the gases consumed by the reaction, make-up gas is continually supplied under pressure through pipe A.

I have discovered that when methanol is produced from a mixture of theoretical proportions of carbon dioxide and hydrogen, and even when less than the theoretical proportion of carbon dioxide is employed there is a formation of methane and carbon monoxide in the circulating gas mixture and, further that free carbon is deposited in the apparatus. Also, the proportion of water found with the methanol when the mixture is removed, by condensation, from the apparatus, is much greater than that that should be formed by the methanol reaction.

From the results thus attained it appears that there are a number of primary reactions occurring at different rates, rather than one or two simple reactions.

The group of reactions which occur in varying degrees is believed to be as follows:—

(1) $3H_2 + CO_2 \rightleftharpoons H_2O + CH_3OH$;
(2) $CO_2 + H_2 \rightleftharpoons CO + H_2O$;
(3) $CO_2 + 4H_2 \rightleftharpoons CH_4 + H_2O$;
(4) $CO + 3H_2 \rightleftharpoons CH_4 + H_2O$;
(5) $CO + 2H_2 \rightleftharpoons CH_3OH$;
(6) $CH_4 + CO_2 + H_2 \rightleftharpoons 2CH_3OH$;
(7) $2CO \rightarrow CO_2 + C$.

It is thus seen that the desired course of the reaction—i. e. methanol production—is attained by the advantageous reactions 1, 5, and possibly 6. On the other hand reaction 2 produces carbon monoxide and water. The carbon monoxide formed in reaction 2 may react advantageously with hydrogen to produce methanol according to reaction 5 or disadvantageously to produce carbon (Reaction 7) or methane (Reaction 4). Such carbon as is formed is, of course, removed from the process and Reaction 7 is practically irreversible. The reactions, advantageous or disadvantageous, which produce water are also largely irreversible since water is constantly removed from the process together with the condensed methanol formed as the desired product.

As illustrative of the conditions prevailing when it is attempted to react carbon dioxide and hydrogen in theoretical proportions the following typical experiment is cited.

A gas mixture comprising theoretical proportions of hydrogen and carbon dioxide (i. e. approximately 25% carbon dioxide) was circulated over a methanol catalyst containing a mixture of zinc and chromium oxides for a period of 12 hours. The catalyst temperature was 420° C. and the gas pressure was 3500 pounds. After passing over the catalyst, the gases were cooled and the mixture of methanol and water formed by the reaction was condensed under pressure and removed from the system. The residual (unreacted) gases were supplemented by fresh gas and recirculated. Under these conditions there was produced 1.5 liters of liquid per hour per liter of catalyst, the liquid showing 60% methanol on analysis where theoretically it should contain 70% by volume. An analysis of the circulating gas after 12 hours of reaction showed the following composition:—

```
                       Per cent
Carbon dioxide___21
Carbon monoxide_12
Methane_____ 5.2
Hydrogen_____61.8
```

It should be noted that this analysis of the gases circulated over the catalyst was made after the process had been in operation twelve hours and should be further remarked that prior gas analyses showed that a practically static condition had been reached. In other words, the proportions of methane and carbon monoxide found in the system were no longer increasing. The lowered yield of methanol in the condensate is attributable only to the disadvantageous reactions previously mentioned, which, on account of greater rapidity or selective action permit the decomposition of carbon dioxide and of hydrogen without a corresponding methanol production.

The results of the experiment show that while the use of a gas mixture of theoretical proportions of carbon dioxide and hydrogen in the methanol process does not produce a theoretical quantity of methanol, still a more or less static condition is set up after a time in the circulating system. This is desirable, since it permits operation without constantly changing the proportions of the "make-up"

gas to maintain a definite proportion of gases in the circulating system.

By experiment, I have discovered that when the proportion of carbon dioxide to hydrogen is greatly decreased the percentage of methanol in the condensate approaches more closely the theoretical figure, (approximately 70%), which indicates that by the use of such proportions the undesirable side reactions are partially or wholly inhibited and the waste of gases is thus avoided. I have discovered that when the gas mixture passing over the catalyst comprises 1–5% carbon dioxide and 99–95% hydrogen, the most favorable results are obtained.

While the supplying of gases to the process in these favorable proportions produces the desirable result mentioned, it is obvious that difficulties would be encountered on the continued operation of the process. If a mixture of 3% carbon dioxide and 97% hydrogen is constantly supplied to the process, all of the carbon dioxide will be converted to methanol but a great excess of hydrogen will remain unreacted. If the "make-up gas" supplied to the process to maintain the pressure is of the same composition, the result occurring on continued operation will be a gradual diminution in the percentage of carbon dioxide in the system until it reaches an infinitesimal figure at which practically no methanol will be formed.

In the practice of my invention this difficulty may be easily avoided. To adjust the process so that a gas of any desired proportion of carbon dioxide will be present in the mixture passing over the catalyst, the circulatory system in which the process operates is filled with substantially pure hydrogen gas at a pressure somewhat below the pressure desired for operation. The circulation of this gas through the system naturally produces no reaction of any kind. When this adjustment has been accomplished a change is made in the gas supplied under pressure to the system and instead of pure hydrogen, a mixture of carbon dioxide and hydrogen in the proportions theoretically required to make methanol is supplied to the system. This gas blends with the pure hydrogen in the system and at the point where the gases pass the catalyst, the percentage of carbon dioxide is very small.

Since under the favorable reaction conditions thus effected the carbon dioxide is converted almost entirely to methanol, the amount of carbon dioxide disappearing from the system is directly proportionate to the amount of hydrogen disappearing. Consequently if the gas mixture of theoretical proportions is constantly supplied as make-up gas at a rate which maintains a constant pressure in the system, methanol and water are continually produced, and the composition of the gas in the circulating system remains unchanged. In this manner a most desirable "static condition" is set up in which a gas of one unvarying composition remains in the circulating system and another gas of a different but also unvarying composition is supplied to the system at the same rate at which the theoretical mixture of methanol and water is formed.

Instead of filling the circulating system with pure hydrogen at a pressure approximating the pressure desired for the reaction, the gas placed in the circulating system may contain some carbon dioxide. This may be accomplished either by filling the system at the pressure of operation with a gas containing a predetermined quantity of carbon dioxide, or by passing pure hydrogen into the system until only part of the pressure desired for operation has been attained, and then adding a gas containing theoretical proportions of carbon dioxide and hydrogen, until the desired pressure has been attained. In this manner it is possible to adjust the gas in the circulating system to any desired ratio of carbon dioxide to hydrogen. Then, to operate the process, the "make up gas" of theoretical proportions is supplied to the system and a similar static condition may be attained.

However if this adjustment produces a circulating system gas which contains more than 5% of carbon dioxide, a loss of gases will occur on account of the undesirable reactions previously described. Large quantities of methane and carbon monoxide will be built up in the system and while continued operation of the process will finally produce a static condition in that the composition of gases in the circulating system becomes unchanging in composition, the yield of methanol will be much lower than that theoretically obtainable.

Typical results obtained by this method of operation are indicated in the following tabulations:—

*Table I*

| Expt. No. | Analysis of gases circulating over catalyst | | | | Yield* | Purity** | Operation*** |
|---|---|---|---|---|---|---|---|
| | CO₂ | CO | CH₄ | H₂ | | | |
| 1 | 11.0 | 7.5 | 10 | 71.5 | 2.9 | 60.5 | 12 |
| 2 | 6.5 | 7.0 | 9 | 77.5 | 3.4 | 62 | 11 |
| 3 | 3.2 | 5.2 | 6 | 85.6 | 3.1 | 63 | 12 |
| 4 | 2.0 | 3.2 | 2 | 92.8 | 2.0 | 66 | 10 |

* Liters of condensate per hour per liter of catalyst.
** Percent by volume of methanol in condensate (remainder being water).
*** Hours of operation at time of test.

In the experiments above reported, a pressure of 3500 pounds was employed, and the "make-up gas" supplied to the process was a mixture of carbon dioxide and hydrogen of approximately the theoretical proportions required for methanol production. The temperature employed was 420° C. in each case, and a space velocity of 100,000 was employed. The variance in results shown in the experiments is due to variance in the gas present in the circulating system before the methanol reaction was started—that is before the make-up gas was supplied to the process.

Table I indicates that as the percentage of carbon dioxide in the circulating gases was reduced from 11% to 2%, the per cent of methanol in the condensate was increased from 60.5% to 66%. The percentages of methane and carbon monoxide present in the circulating system are also reduced as the result of the dimunition in carbon dioxide. The fact that in Experiment 4 the percentage of carbon monoxide in the circulating gases exceeded the percentage of carbon dioxide is of no importance, for the production of a larger percentage of methanol in the condensate than was obtained in the other experiments indicates that disadvantageous side reactions were diminished in activity. Apparently the methane and carbon monoxide were formed during the first stages of reaction before a static condition in the circulating system was attained.

While Experiment 2, employing 6.5% carbon dioxide in the circulating system, gave the largest yield of condensate per hour, this is not the consideration of prime importance in the economy of the process. Any desired yield of condensate per hour may be obtained by increasing the apparatus and the amount of catalyst employed. The greatest economy and efficiency of operation is attained when all of the gases removed from the process enter into the production of the theoretical mixture of methanol and water, rather than disadvantageous side reactions. For example, the same volume of condensate per hour as was obtained in Experiment 2 may be obtained in Experiment 4 by merely doubling the amount of catalyst employed, and modifying the apparatus accordingly.

Table II

| Expt. No. | Analysis of gases circulating over catalyst | | | | Yield* | Purity** | Time of operation*** |
|---|---|---|---|---|---|---|---|
| | CO$_2$ | CO | CH$_4$ | H$_2$ | | | |
| 5 | 11 | 15 | 8 | 66 | 2.45 | 63 | 12 |
| 6 | 7.2 | 13 | 6 | 73.8 | 1.95 | 65 | 12 |
| 7 | 3 | 2.5 | 1 | 93.5 | 1.85 | 69 | 10 |

* Liters of condensate per hour per liter of catalyst.
** Percent by volume of methanol in condensate (remainder being water).
*** Hours of operation at time of test.

In the experiments reported in Table II a pressure of 3500 pounds was employed and the "make-up" gas supplied to the process was a mixture of carbon dioxide and hydrogen of approximately the theoretical proportions required for methanol production. In each case a temperature of 390° C. and a space velocity of 60,000 was employed.

Table II confirms Table I in showing the favorable effect obtained by employing a gas mixture containing only a small proportion of carbon dioxide. Since the temperature employed (390° C.) is a more favorable one, the purity of the methanol thus produced is greater; for example, Experiment 7 produced a condensate containing practically the theoretical proportions of methanol and water.

My process is in no way dependent on the use of a specific catalyst. In general, any catalyst suitable for synthetic methanol production may be employed in the process, these catalysts ordinarily consisting of mixtures of metallic oxides such as are described, for example, in United States Patents 1,558,559; 1,608,643; and 1,609,593; and English Patents 229,714 and 229,715.

My invention is in no way dependent, for its operation, on the employment of the specific apparatus disclosed in the drawing and it is obvious that many manipulative variations might be made without departing from the spirit thereof.

My invention is not dependent on the maintenance of a static condition within the circulating system whereby make-up gas of theoretical proportions is passed into a system of circulating gas originally composed of substantially pure hydrogen, this process being the subject matter of application Serial No. 154,635, filed December 13th, 1926.

For example, the favorable result attendant on the use of a very small proportion of carbon dioxide in the methanol synthesis may be accomplished by passing a gas of the proportion of 3% carbon dioxide and 97% hydrogen into the system under pressure, circulating it to make methanol, gradually adding carbon dioxide to the system to replenish the carbon dioxide converted to methanol, and, occasionally adding some hydrogen to maintain the correct proportions of materials in the circulating gas. Or, alternatively, the circulating system may be dispensed with and a gas of the correct proportions may be passed through a number of catalyst beds in series, pressure being maintained in the system, so that a preponderance of the gas entering the system is converted to methanol and water by one passage, the residual gases being recovered for use in another passage.

Now having fully described my invention, I claim the following as new and novel.

1. In the process of manufacturing methanol by the interaction of hydrogen and carbon dioxide in the presence of a catalyst and under the influence of elevated pressure and temperature, the steps which comprise passing a gas consisting of 1-5% carbon dioxide and 99-95% hydrogen over said catalyst, circulating said gas mixture to make methanol, adding hydrogen and carbon dioxide to the system to replenish that consumed, the amount of carbon dioxide in said system being always maintained below approximately 5%.

2. In the process of manufacturing methanol by the interaction of hydrogen and carbon dioxide in the presence of a catalyst and under the influence of elevated pressure and temperature, the steps which comprise passing a gas consisting of approximately 3% carbon dioxide and 97% hydrogen over said catalyst, circulating said gas mixture to make methanol, gradually adding carbon dioxide to the system to replenish the carbon dioxide converted to methanol, adding sufficient hydrogen to the system to maintain the correct proportions of materials in the circulating gas, the amount of carbon dioxide in said system being maintained at approximately 3%.

3. In the process of manufacturing methanol by the interaction of hydrogen and carbon dioxide in the presence of a catalyst and under the influence of elevated pressure and temperature, the steps which comprise passing a gas consisting of 1-5% carbon dioxide and 99-95% hydrogen over said catalyst, adding to the residual gases hydrogen and carbon dioxide in sufficient quantities to replenish the carbon dioxide and hydrogen consumed, the amount of carbon dioxide in said system being maintained below approximately 5%.

4. In the process of manufacturing methanol by the interaction of hydrogen and carbon dioxide in the presence of a catalyst and under the influence of elevated pressure and temperature, the steps which comprise passing a gas consisting of approximately 3% carbon dioxide and 97% hydrogen over said catalyst, adding to the residual gases hydrogen and carbon dioxide in sufficient quantities to replenish the carbon dioxide and hydrogen consumed, the amount of carbon dioxide in said system being maintained at approximately 3%.

In testimony whereof I affix my signature.

WILLIAM J. EDMONDS.